(12) United States Patent
Kanie et al.

(10) Patent No.: US 8,691,453 B2
(45) Date of Patent: Apr. 8, 2014

(54) FUEL CELL SYSTEM

(75) Inventors: Naoki Kanie, Toyota (JP); Yoshiaki Naganuma, Nissin (JP); Tomoya Ogawa, Toyota (JP)

(73) Assignee: Toyota Jidosha Kabushiki Kaisha, Toyota-Shi (JP)

( * ) Notice: Subject to any disclaimer, the term of this patent is extended or adjusted under 35 U.S.C. 154(b) by 960 days.

(21) Appl. No.: 12/810,121

(22) PCT Filed: Dec. 2, 2008

(86) PCT No.: PCT/JP2008/071879
§ 371 (c)(1),
(2), (4) Date: Jun. 22, 2010

(87) PCT Pub. No.: WO2009/081697
PCT Pub. Date: Jul. 2, 2009

(65) Prior Publication Data
US 2010/0266920 A1    Oct. 21, 2010

(30) Foreign Application Priority Data
Dec. 25, 2007 (JP) .................................. 2007-333092

(51) Int. Cl.
*H01M 8/06* (2006.01)
(52) U.S. Cl.
USPC ........... 429/427; 429/431; 429/428; 429/429; 429/443; 429/444
(58) Field of Classification Search
CPC ..................... H01M 8/04089; H01M 8/04574; H01M 8/04589; H01M 8/04395; H01M 8/0441; H01M 8/04664; Y02E 60/50
USPC .......... 429/427, 428, 429, 431, 443, 444, 446
See application file for complete search history.

(56) References Cited

U.S. PATENT DOCUMENTS

2009/0098426 A1* 4/2009 Tsuchiya et al. ................. 429/23
2009/0269628 A1 10/2009 Imanishi et al.

FOREIGN PATENT DOCUMENTS

| JP | 2006-073501 A | 3/2006 |
| JP | 2007-280800 A | 10/2007 |
| JP | 2007-317473 A | 12/2007 |
| JP | 2007-317474 A | 12/2007 |
| JP | 2007-317475 A | 12/2007 |
| JP | 2007317474 A * | 12/2007 |
| JP | 2008-269812 A | 11/2008 |
| JP | 2009-26632 A | 2/2009 |
| WO | WO 2007046545 A1 * | 4/2007 |
| WO | WO 2007/117015 A1 | 10/2007 |
| WO | WO 2007/117018 A1 | 10/2007 |

* cited by examiner

*Primary Examiner* — Basia Ridley
*Assistant Examiner* — Heng Chan
(74) *Attorney, Agent, or Firm* — Kenyon & Kenyon LLP

(57) ABSTRACT

Even if a failure occurs in a bypass valve during low-efficiency power generation, the occurrence of an excessive stoichiometry ratio in a fuel cell can be prevented. An output from a pressure sensor or a current sensor is monitored by a control device, and when a failure associated with a closed-valve malfunction of the bypass valve occurs, the degree of opening of the pressure regulating valve is increased to increase an amount of cathode-off gas exhaust, and a revolution speed of an air compressor is reduced to an amount of air discharged by the air compressor, thereby preventing an excessive stoichiometry ratio in the fuel cell.

6 Claims, 10 Drawing Sheets

$(2H^+ + 2e^- + 1/2 O_2 \rightarrow H_2O)$    $(H_2 \rightarrow 2H^+ + 2e^-)$ $(2H^+ + 2e^- \rightarrow H_2)$    $(H_2 \rightarrow 2H^+ + 2e^-)$

FUEL CELL SYSTEM

This is a 371 national phase application of PCT/JP2008/071879 filed 2 Dec. 2008, which claims priority to Japanese Patent Application No. 2007-333092 filed 25 Dec. 2007, the contents of which are incorporated herein by reference.

FIELD OF THE INVENTION

The invention relates to a fuel cell system provided with a fuel cell for generating electrical energy through an electrochemical reaction between hydrogen and oxygen.

BACKGROUND OF THE INVENTION

Among fuel cells for generating electrical power utilizing an electrochemical reaction between hydrogen and oxygen, polymer electrolyte fuel cells are commonly known. The polymer electrolyte fuel cell includes a stack which is constituted from a plurality of stacked cells. The cells constituting the stack each include an anode (fuel electrode) and a cathode (air electrode), and a solid polymer electrolyte membrane having a sulfonic acid group as an ion exchange group is interposed between each anode and cathode.

A fuel gas containing a fuel gas (hydrogen-enriched reformed hydrogen obtained by reforming hydrogen gas or hydrocarbon) is supplied to the anode, while an oxygen-containing gas (oxidant gas), e.g., air, is supplied to the cathode as an oxidant. Upon the supply of the fuel gas to the anode, hydrogen contained in the fuel gas reacts with catalyst in a catalyst layer which constitutes the anode, thereby generating hydrogen ions. The generated hydrogen ions pass through the solid polymer electrolyte membrane and electrically react with oxygen in the cathode. Electrical power is thus generated through the electrochemical reaction.

Meanwhile, in fuel cell systems, in an attempt to start a fuel cell system at a low temperature, if water from when the system last stopped still remains in a fuel cell, the remaining water freezes and may cause the system to be unable to start. Even if the system can be started, product water resulting from its own reaction may freeze and cause power generation to stop.

In light of such circumstances, the power generation efficiency of fuel cells has been controlled in order to control self-heating power. In order to increase the self-heating power, a fuel cell is operated with a short supply of a reaction gas by, for example, reducing the supply of the reaction gas or causing a short-circuit between the electrodes of the fuel cell, so that an overvoltage between the electrodes of the fuel cell is increased. In this instance, when the supply of the reaction gas is reduced to maintain the voltage of the fuel cell at around 0 volts, there is a possibility that a reverse potential is generated in a cell, which causes hydrogen to be transferred to an oxygen electrode of the fuel cell and to be exhausted from an air exhaust path. Accordingly, it has been proposed that a bypass path for connecting the downstream of an air blower in an air supply path and the air exhaust path to each other, so that the external air supplied from the air blower is introduced in the air exhaust path via the bypass path to dilute the hydrogen inside the air exhaust path (see Patent Document 1).

Patent Document 1: Japanese laid-open patent publication No. 2006-73501

DISCLOSURE OF THE INVENTION

During warm-up of a fuel cell by low efficiency power generation with a reduced supply of the reaction gas, if a failure occurs in a bypass valve for controlling an amount of air flowing in the bypass path in order to dilute the hydrogen in the air exhaust path—for example, if the bypass valve becomes unable to move (hereinafter referred to as "valve sticking") due to freezing, etc., which causes the valve to be unable to open (hereinafter referred to as closed-valve malfunction)—the amount of air supplied to the fuel cell increases, an excessive stoichiometry ratio occurs in the fuel cell, which might result in the increase of I-V characteristics of the fuel cell and the generation of excessive power generation energy.

When a converter voltage control is carried out in such a state, an overcurrent flows in a DC/DC converter and a secondary cell, which might break the DC/DC converter and the secondary cell. In addition, if a backpressure valve (pressure regulating valve) is controlled to be closed with a valve sensor being frozen and inoperable, the stack of fuel cells might be broken due to the increase in air pressure.

Other aspects and advantages of the invention will be apparent from the following description and the appended claims.

An object of the present invention is to provide a fuel cell system capable of preventing an excessive stoichiometry ratio in a fuel cell even when a failure occurs in a bypass valve during low-efficiency power generation.

In order to achieve the object above, the present invention provides a fuel cell system including a bypass valve provided in a bypass path for providing a bypass between an air supply side of a fuel cell and an air exhaust side of the fuel cell, in which, when a failure occurs in the bypass valve during low-efficiency power generation, a pressure of the air exhaust side of the fuel cell is reduced to increase the amount of cathode-off gas to be discharged, and the air supply is reduced.

With such a configuration, when a failure occurs in the bypass valve during the low-efficiency power generation of the fuel cell, the pressure on the exhaust side of the fuel cell (e.g., cathode-off gas flow path) is reduced to increase the amount of the cathode-off gas to be discharged, while the air supply is reduced, and therefore an excessive stoichiometry ratio in the fuel cell system can be prevented, thereby preventing the system from breaking down due to the generation of excessive power generation energy.

The fuel cell system may include the additional elements below. Preferably, the fuel cell system includes: an air backpressure valve provided on the air exhaust side of the fuel cell; and an air compressor for supplying air to the air supply side of the fuel cell, in which, when a failure occurs in the bypass valve, the degree of opening of the air backpressure valve is increased, while the revolution speed of the air compressor is decreased.

With such a configuration, when a failure occurs in the bypass valve, an excessive stoichiometry ratio in the fuel cell can be prevented by increasing the degree of opening of the air backpressure valve and reducing the revolution speed of the air compressor.

Preferably, the fuel cell system includes: a bypass failure detector for detecting a failure in the bypass valve; and a controller for controlling the air backpressure valve and the air compressor, in which the controller increases the degree of opening of the air backpressure valve and reduces the revolution speed of the air compressor in response to a detection output from the bypass failure detector.

With such a configuration, when the bypass failure detector detects a failure in the bypass valve, the controller increases the degree of opening of the air backpressure valve, while reducing the revolution speed of the air compressor, thereby automatically preventing an excessive stoichiometry ratio in the fuel cell.

Preferably, the bypass failure detector monitors the pressure on the air-discharge side of the air compressor, and detects a failure associated with a closed-valve malfunction of the bypass valve when the pressure exhibits an abnormal value.

With such a configuration, a failure associated with the closed-valve malfunction of the bypass valve can be detected when the pressure on the air-discharge side of the air compressor exhibits an abnormal value.

Preferably, the bypass failure detector detects a failure associated with a closed-valve malfunction of the bypass valve when an absolute value or a change rate of a current of the fuel cell exceeds a current threshold.

With such a configuration, a failure associated with the closed-valve malfunction of the bypass valve can be detected when the absolute value or the change rate of the current of the fuel cell exceeds the current threshold.

Preferably, the bypass failure detector includes: a pressure sensor for detecting the pressure on the air-discharge side of the air compressor; and a pressure judgment unit for judging a failure associated with a closed-valve malfunction of the bypass valve when a pressure detected by the pressure sensor exceeds the pressure threshold.

With such a configuration, a failure associated with a closed-valve malfunction of the bypass valve can be detected when the pressure on the air-discharge side of the air compressor exceeds the pressure threshold.

Preferably, the bypass failure detector includes: a current sensor for detecting a current of the fuel cell; and a current judgment unit for judging a failure associated with a closed-valve malfunction of the bypass valve when the difference between a current detected by the current sensor and a current command value exceeds a current threshold.

With such a configuration, the current of the fuel cell is detected, and when the difference between the detected current and the current command value exceeds the current threshold, a failure associated with a closed-valve malfunction of the bypass valve can be detected.

The present invention can prevent an excessive stoichiometry ratio in the fuel cell during low-efficiency power generation, and thus can prevent the system from breaking down due to the generation of an excessive power generation energy.

BEST MODE FOR CARRYING OUT THE INVENTION

Figure 1:
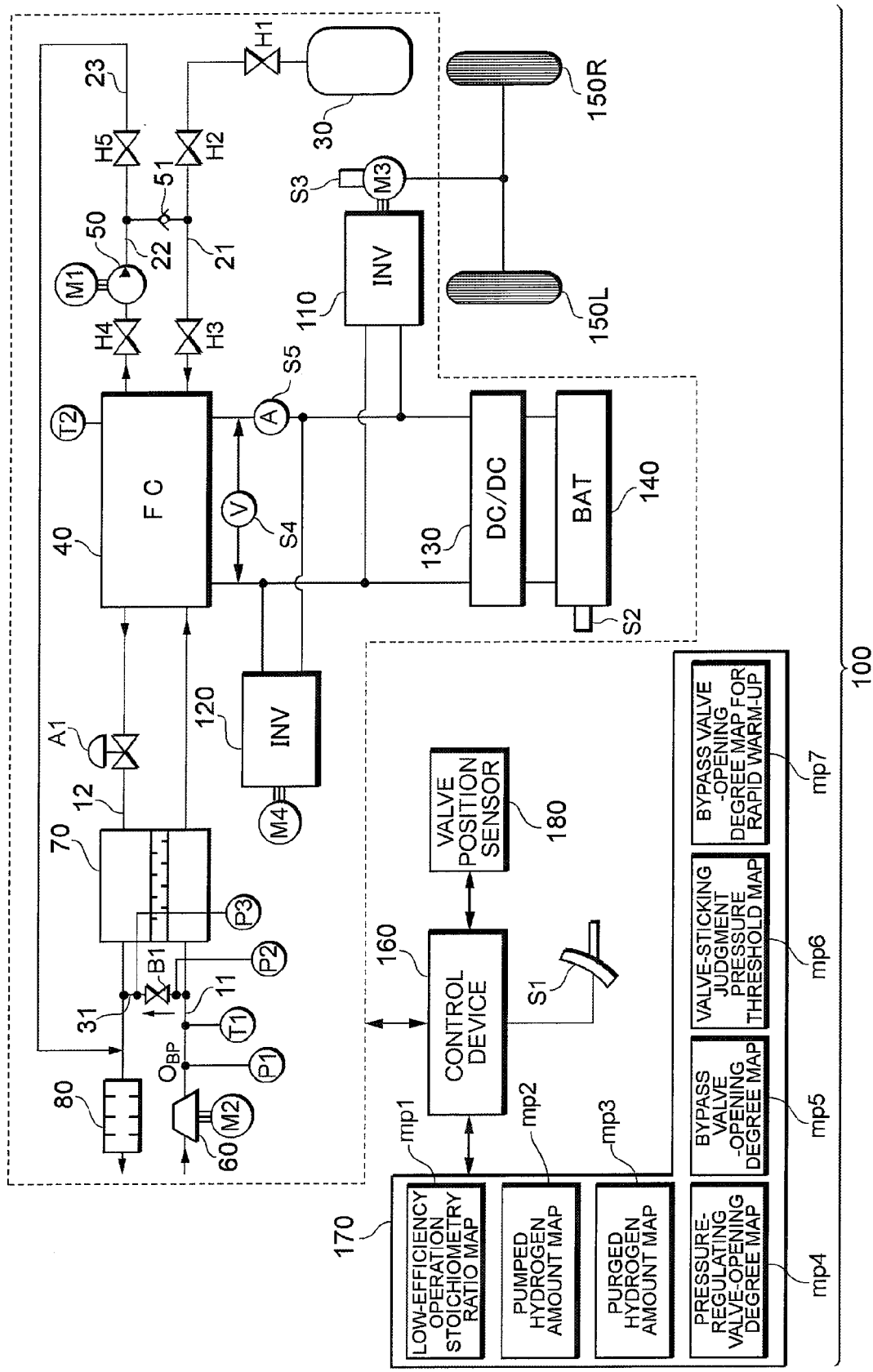
FIG. 1 is a block diagram showing a fuel cell system according to an embodiment.

Now, an embodiment according to the present invention will be described with reference to the attached drawings.
Embodiment FIG. 1 is a diagram showing a primary configuration in a fuel cell system 100 according to an embodiment.

This embodiment assumes fuel cell systems mounted on vehicles such as fuel cell hybrid vehicles (FCHV), electric vehicles and hybrid vehicles, but the fuel cell system may be applied not only to the vehicles but also to various mobile objects (e.g., ships, airplanes and robots) and stationary power supplies.

The fuel cell system 100 includes a fuel gas circulation/supply system and an oxidant gas supply system.

The fuel gas circulation/supply system includes a fuel gas supply source 30, a fuel gas supply path 21, a fuel cell 40, a fuel gas circulation path 22, and an anode-off gas flow path 23. The oxidant gas supply system includes an air compressor 60, an oxidant gas supply path 11, and a cathode-off gas flow path 12

The fuel cell 40 is a means for generating electrical power from supplied reaction gases (fuel gas and oxidant gas), and has a stack structure in which a plurality of unit cells, each provided with a MEA (membrane/electrode assembly), etc., are stacked in series. Specifically, various types of fuel cells, such as polymer electrolyte fuel cells, phosphoric acid fuel cells and molten carbonate fuel cells may be used.

The fuel gas supply source 30 is a means for supplying a fuel gas such as hydrogen gas to the fuel cell 40, and is typically constituted by a high-pressure hydrogen tank, a hydrogen storage tank, etc. The fuel gas supply path 21 is a gas flow path for guiding the fuel gas discharged from the fuel gas supply source 30 to an anode of the fuel cell 40, and the gas flow path is provided, from the upper stream to the down stream, with valves such as a tank valve H1, a hydrogen supply valve H2, and an FC inlet valve H3. The tank valve H1, the hydrogen supply valve H2, and the FC inlet valve H3 are shut valves for supplying (or shutting off the supply of) the fuel gas to the gas flow paths 21 to 23 or the fuel cell 40, and these valves are typically constituted by solenoid valves.

The fuel gas circulation path 22 is a return gas flow path for returning unreacted fuel gas to the fuel cell 40, and is provided, from the upstream to the down stream, with an FC outlet valve H4, a hydrogen pump 50, and a check valve 51. Low-pressure unreacted fuel gas discharged from the fuel cell 40 is pressurized to a suitable pressure by the hydrogen pump 50 and then guided to the fuel gas supply path 21. The backflow of the fuel gas from the fuel gas supply path 21 to the fuel gas circulation path 22 is prevented by the check valve 51.

The anode-off gas flow path 23 is a gas flow path for exhausting, to the outside of the system, anode-off gas containing hydrogen-off gas discharged from the fuel cell 40, and is provided with a purge valve H5 in the gas flow path.

The oxidant gas supply path 11 in the oxidant gas supply system is a path on the supply side of the fuel cell 40, and is connected to a cathode inlet of the fuel cell 40 via the air compressor 60 and a humidification module 70. The cathode-off gas flow path 12 is a path on the exhaust side of the fuel cell 40, and connects a cathode outlet of the fuel cell 40 to the dilution unit 80 via a pressure regulating valve A1 and the humidification module 70.

The air compressor (gas supply source) 60 supplies air (oxidant gas; cathode gas) introduced via an air filter (not shown) from the outside to the cathode of the fuel cell 40 via the cathode inlet. Cathode-off gas is exhausted from the cathode outlet of the fuel cell 40. The cathode-off gas contains oxidant-off gas after use for the cell reaction of the fuel cell 40, and also contains pumping hydrogen generated in the cathode (described later in more detail). The cathode-off gas is highly humid since it contains moisture generated in the cell reaction of the fuel cell 40.

The humidification module 70 exchanges moisture between less-humid oxidant gas flowing in the oxidant gas supply path 11 and highly-humid cathode-off gas flowing in the cathode-off gas flow path 12, thereby properly humidifying oxidant gas to be supplied to the fuel cell 40. The back-pressure of the oxidant gas to be supplied to the fuel cell 40 is regulated by the pressure regulating valve A1 provided in the vicinity of the cathode outlet of the cathode-off gas flow path 12, under the control of a control device 160. The oxidant gas supply path 11 extending from the air compressor 60 to the humidification module 70 is provided with a pressure sensor P1 for detecting the pressure of the supplied oxidant gas and a temperature sensor T1 for detecting the temperature of the detected oxidant gas.

The oxidant gas supply path 11 extending from the air compressor 60 to the humidification module 70 and the cathode-off gas flow path 12 extending from the humidification module 70 to the dilution unit 80 are connected to each other via a bypass valve B1. The bypass valve (bypass device) B1 and a bypass path (bypath device) 31 bypass the fuel cell 40 and guide a part of oxidant gas flowing in the oxidant gas supply path 11 to the cathode-off gas flow path (discharge path) 12, and an amount of the oxidant gas to be bypassed (hereinafter referred to as "bypass air") is controlled by the control device (regulator) 160. The bypass path 31 is provided with: a pressure sensor P2 for detecting the pressure of the bypass air before passing through the bypass valve B1 (primary pressure); and a pressure sensor P3 for detecting the pressure of the bypass air after having passed through the bypass valve B1 (secondary pressure). In addition, provided in the vicinity of the bypass valve B1 is a valve position sensor (detector) 180 for detecting the position of the bypass valve B1 under the control of the control device (detector) 160.

The dilution unit 80 dilutes the concentration of hydrogen gas to be discharged so as to be within a preset concentration range (e.g., as a range defined pursuant to environmental standards). The dilution unit 80 is connected to the downstream of the cathode-off gas flow path 12 and the downstream of the anode-off gas flow path 23, dilutes hydrogen-off gas and pumping hydrogen by mixing with oxygen-off gas and bypass air, and then exhausts these gases to the outside of the system.

The voltage of a part of the direct-current power generated by the fuel cell 40 is increased or decreased by a DC/DC converter 130 and then used for charging a battery 140.

The battery 140 is a chargeable secondary battery and constituted by various types of secondary batteries (e.g., a nickel-hydrogen battery). Obviously, a chargeable and dischargeable capacitor other than the secondary battery may be used instead of the battery 140.

A traction inverter 110 and an auxiliary inverter 120 are pulse-width modulated (PWM) inverters, which transform a direct-current power output from the fuel cell 40 or the battery 140 to a three-phase AC power in accordance with a given control command, and supply the three-phase AC power to a traction motor M3 and an auxiliary motor M4.

The traction motor M3 is a motor for driving wheels 150L and 150R, and the auxiliary motor M4 is a motor for driving each auxiliary apparatus. The auxiliary motor M4 is a generic term which refers to a motor M1 for driving the hydrogen circulation pump 50 and a motor M2 for driving the air compressor 60.

The control device 160 is constituted by a CPU, a ROM or a RAM, which provides a central control for each section in the system based on each input sensor signal. Specifically, the control device 160 controls output pulse widths of the inverters 110 and 120 based on sensor signals input from: an accelerator pedal sensor S1 for detecting the degree of opening of an accelerator pedal; a SOC sensor S2 for detecting the state of charge (SOC) of the battery 140 while it is being charged a T/C motor revolution speed sensor S3 for detecting the revolution speed of the traction motor M3; a voltage sensor S4 for detecting an output voltage of the fuel cell 40; and a current sensor S5 for detecting an output current, as well as sensor signals input from other sensors such as temperature sensors T1 and T2, and pressure sensors P1 to P3.

When the control device 160 needs to warm up the fuel cell 40, e.g., when starting the system at a low temperature, the control device 160 uses maps mp1 to mp5, etc. stored in a memory 170 to carry out an operation with low-efficiency power generation.

Figure 2:
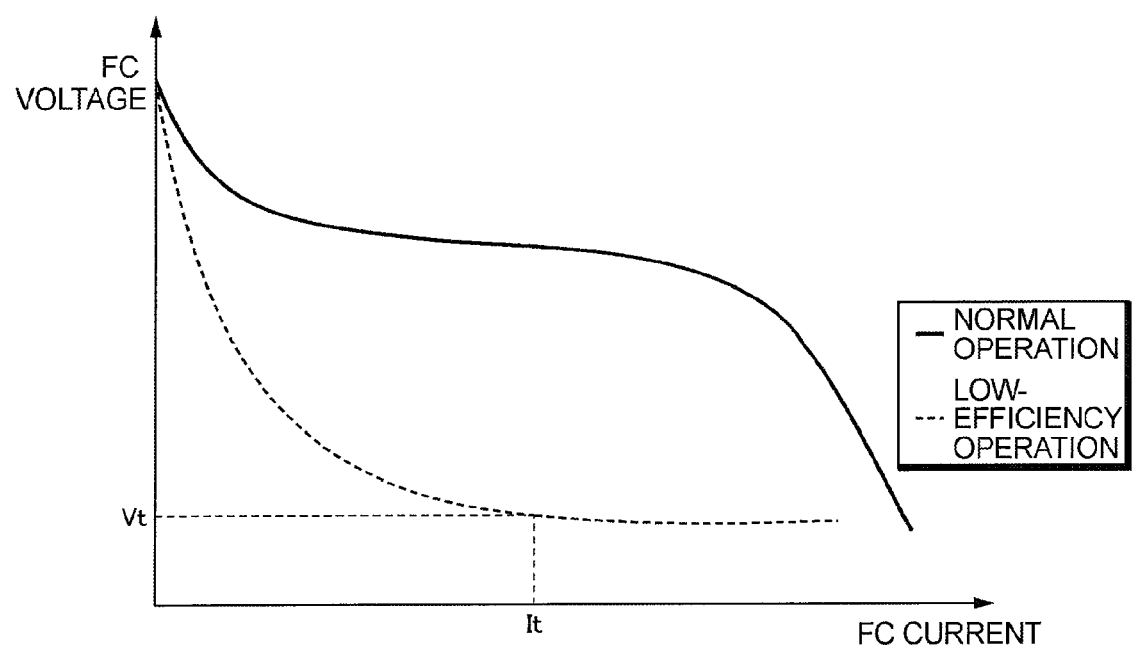
FIG. 2 is a graph showing the relationship between an FC current and an FC voltage according to the embodiment.

FIG. 2 is a graph showing the relationship between the output current (FC current) and the output voltage (FC voltage) of the fuel cell, where the solid line shows an operation with high-efficiency power generation (a normal operation) and the dotted line shows an operation with low-efficiency power generation (a low-efficiency operation) which is carried out by reducing an amount of oxidant gas. Note that the horizontal axis represents the FC current, while the vertical axis represents the FC voltage.

When the fuel cell 40 is normally operated, the fuel cell 40 is operated in the state where the air stoichiometry ratio is set to 1.0 or higher (theoretical value) so that high-efficiency power generation can be realized with reduced power loss (see the solid line in FIG. 2). The "air stoichiometry ratio" used herein refers to the ratio of excess air supply with respect to a theoretical air supply required for generating the FC current.

On the other hand, when the fuel cell 40 is warmed up, the fuel cell 40 is operated in a state where the air stoichiometry ratio is set to around 1.0 (theoretical value) in order to raise the temperature of the fuel cell 40 with increased power loss (see the dotted line in FIG. 2). When the fuel cell 40 is operated with a low air stoichiometry ratio, power loss (i.e., heat loss) in the energy obtained by reaction between hydrogen and oxygen is actively increased, and thus the fuel cell can be warmed up rapidly, whereas pumping hydrogen is generated in the cathode.

Figure 3A:
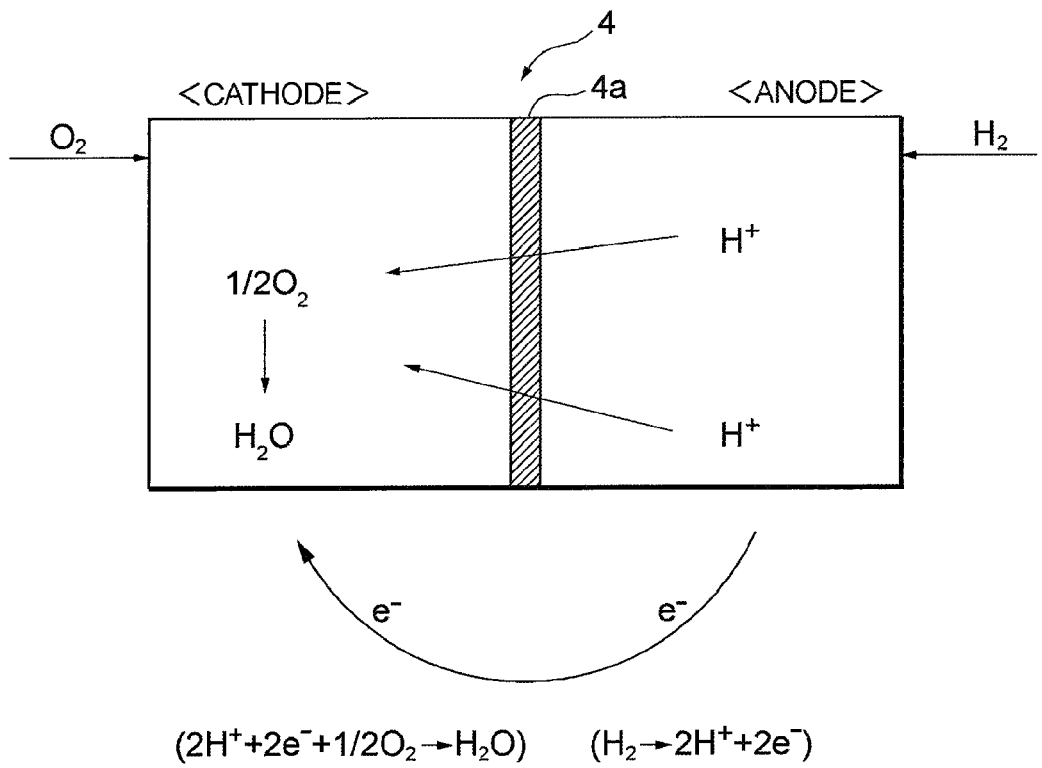
FIG. 3A is a diagram illustrating a mechanism of how pumping hydrogen is generated according to the embodiment.
Figure 3B:
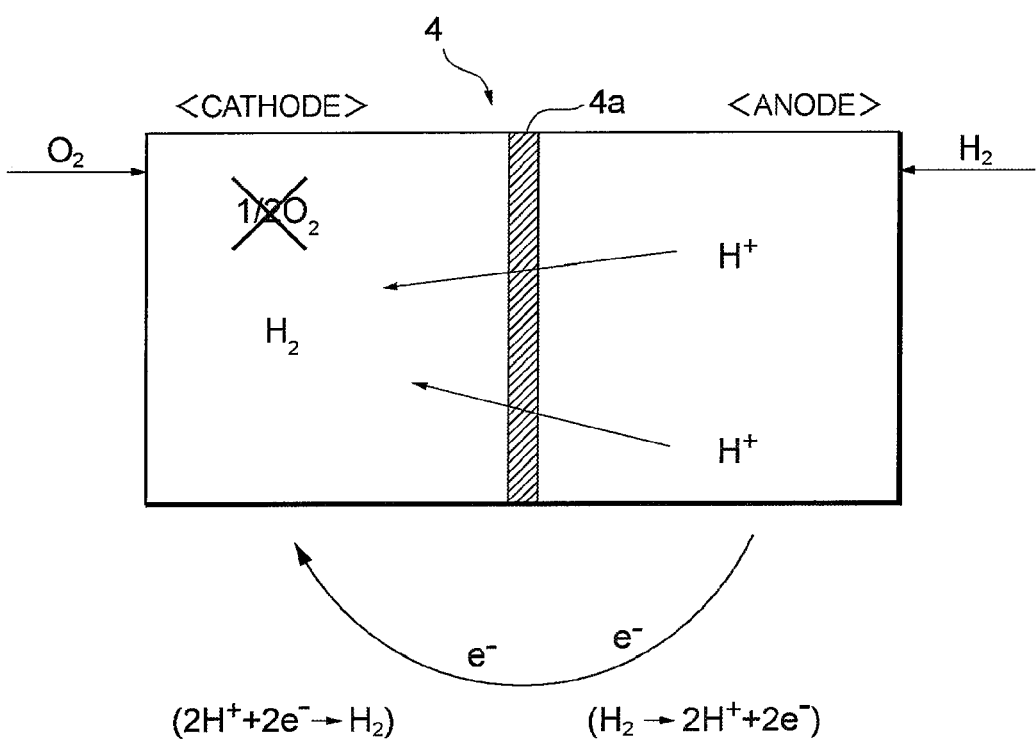
FIG. 3B is a diagram illustrating a mechanism of how pumping hydrogen is generated according to the embodiment.

FIG. 3 is a diagram illustrating a mechanism of how pumping hydrogen is generated, where FIG. 3A shows cell reaction during the normal operation and FIG. 3B shows cell reaction during the low-efficiency operation.

Each cell 4 includes: an electrolyte membrane 4a; and an anode and a cathode which sandwich the electrolyte membrane 4a. Fuel gas containing hydrogen ($H_2$) is supplied to the anode, and oxidant gas containing oxygen ($O_2$) is supplied to the cathode. Upon the supply of the fuel gas to the anode, the reaction represented by formula (A) below proceeds, and the hydrogen is dissociated into a hydrogen ion and an electron. The hydrogen ion generated in the anode permeates through the electrolyte membrane 4a and moves to the cathode, while the electron moves from the anode to the cathode via an external circuit.

When the supply of the oxidant gas to the cathode is sufficient (air stoichiometry ratio≥1.0), the reaction of the formula (B) below proceeds and water is generated from the hydrogen ion and electron (see FIG. 3A). On the other hand, when the supply of the oxidant gas to the cathode is insufficient, e.g., during the low-efficiency power generation, (air stoichiometry ratio<1.0), the reaction of the formula (C) below proceeds in accordance with the amount of shortage of the oxidant gas, and the hydrogen ion and electron are recombined to generate hydrogen (see FIG. 3B). The generated hydrogen is exhausted together with oxygen-off gas from the cathode. Note that hydrogen generated in the cathode as a result of the recombination between the dissociated hydrogen ion and electron, i.e., anode gas generated in the cathode, is referred to as "pumping hydrogen."

$$\text{Anode: } H_2 \rightarrow 2H^+ + 2e^- \quad (A)$$

$$\text{Cathode: } 2H^+ + 2e^- + (½)O_2 \rightarrow H_2O \quad (B)$$

$$\text{Cathode: } 2H^+ + 2e^- \rightarrow H_2 \quad (C)$$

With such a short supply of the oxidant gas to the cathode, since the pumping hydrogen is contained in the cathode-off gas as described above, the degree of opening, etc. of the bypass valve B1 is adjusted in accordance with an amount of the pumping hydrogen contained in the cathode-off gas. By adjusting the flow rate of the bypass air as described above, the concentration of hydrogen to be exhausted can be diluted so as to be within a proper range while supplying the oxidant gas to the fuel cell 40 in an amount required for generating electrical power.

When, in a low temperature environment, the fuel cell 40 is warmed up by carrying out low-efficiency power generation, if a failure occurs in the bypass valve B1 and its valve body is stuck due to freezing, etc., which causes a closed-valve malfunction, the oxidant gas supplied from the air compressor 60 becomes unable to be bypassed via the bypass path 31 or the flow rate of the bypass air becomes uncontrollable, which causes more oxidant gas than required for the low-efficient power generation to be supplied to the fuel cell 40 and consequently causes an excessive stoichiometry ratio in the fuel cell, resulting in a disadvantage where overcurrent flows in the DC/DC converter 130 and the battery 140 in accordance with the increase of I-V characteristics of the fuel cell 140.

Accordingly, in this embodiment, if a failure associated with a closed-valve malfunction of the bypass valve B1 occurs during the low-efficiency power generation, in order to reduce the supply of the oxidant gas required for the low-efficiency power generation to the fuel cell 40, the degree of opening of the pressure regulating valve A1 as an air back-pressure valve is increased to increase the amount of the cathode-off gas to be discharged by reducing the pressure of the cathode-off gas flow path 12, and the revolution speed of the air compressor 60 is reduced to reduce an amount of air discharged by the air compressor 60.

In other words, in this embodiment, when the low-efficiency power generation is carried out, a pressure detected by the pressure sensor P1 or P2, or a current detected by the current sensor S5 is monitored by the control device 160, and the presence of a failure in the bypass valve B1 is determined based on the output of one of these sensors, so that normal processing is performed under normal conditions, while, when a failure is detected, the degree of opening of the pressure regulating valve A1 and the revolution speed of the air compressor 60 are controlled for countering the failure.

Here, as an element of a bypass failure detector, the control device 160 also serves as: a pressure determination unit which determines a failure resulting from a closed-valve malfunction of the bypass valve B1 when the pressure detected by the pressure sensor P1 (or P2) for detecting the pressure of air on the air-discharge side of the air compressor 60 exceeds a pressure threshold; and a current determination unit which determines a failure resulting from a closed-valve malfunction of the bypass valve B1 when a difference between the current detected by the current sensor S5 for detecting a current of the fuel cell 40 and a current command value exceeds a current threshold. In addition, the control device 160 functions as a controller for controlling the degree of opening of the pressure regulating valve A1 to increase and controlling the revolution speed of the air compressor 60 to decrease, in response to detection outputs from the bypass failure detector.

Now, the operation of the fuel cell system during the low-efficiency power generation will be described.

Processing in Normal Operation of Bypass Valve

The control device 160 judges if an FC temperature detected by the temperature sensor T2 is below a reference temperature set in a memory (not shown). The reference temperature herein is a temperature (e.g., 0° C.) used for judging whether or not a low-efficiency operation should be carried out when the system is started. The reference temperature may be preset before a product system is shipped out, or may alternatively be configured to be arbitrarily settable or changeable through operations using buttons, etc.

When detecting that the FC temperature is above the reference temperature, the control device 160 starts normal operation and ends the processing.

On the other hand, when detecting that the FC temperature is below the reference temperature, the control device 160 determines a target low-efficiency operation point (It, Vt) (see FIG. 2), and refers to a low-efficiency stoichiometry ratio map mp1 stored in the memory 170, in order to start the low-efficiency operation. The low-efficiency operation stoichiometry ratio map mp1 is used for determining an air stoichiometry ratio based on an FC current command value It and an FC voltage command value Vt, and has been prepared based on values obtained through experiments, etc. The control device 160 determines an air stoichiometry ratio Ra in the above-mentioned operation point using: the determined FC current command value It and FC voltage command value Vt; and the low-efficiency operation stoichiometry ratio map mp1.

Upon determining the air stoichiometry ratio Ra, the control device 160 refers to a pumping hydrogen amount map mp2 and a purged hydrogen amount map mp3 stored in the memory 170. The pumping hydrogen amount map mp2 is used for estimating an amount of pumping hydrogen to be generated (pumping hydrogen amount) based on the FC current command value It, the determined air stoichiometry ratio Ra, and the temperature of the fuel cell 40 detected by a temperature sensor S6, and has been prepared based on values obtained through experiments, etc. The purged hydrogen amount map mp3 is a map for estimating an amount of the anode-off gas containing hydrogen-off gas (purged hydrogen amount) based on the FC current.

The control device 160 estimates a pumping hydrogen amount Ap1 using the determined FC current command value It, the determined air stoichiometry ratio Ra, the temperature of the fuel cell 40 and the pumping hydrogen amount map mp2, while estimating a purged hydrogen amount Ap2 using the determined FC current command value It and the purged hydrogen amount map mp3, in order to determine a total amount of hydrogen exhaust At the target low-efficiency operation point (It, Vt) (see equation (1) below).

$$At = Ap1 + Ap2 \quad (1)$$

Upon determining the total amount of hydrogen exhaust At, the control device 160 derives an FC-required air flow rate, an air scavenging value and a bypass air flow rate which are required for lowering the concentration of the exhaust hydrogen so as to be below a reference value. First, the control device 160 determines an air flow rate (FC-required air flow rate) An required for the fuel cell 40 using equation (2) below.

$$An = It*\{400*22.4*60/(4*96485)\}*100/21 \quad (2)$$

The control device 160 then obtains an air flow rate (FC-consumed air flow rate) Ac consumed in the fuel cell 40 using equation (3) below, and also obtains an air flow rate (total air flow rate) required for diluting the concentration of hydrogen to be exhausted so as to be below the reference value using equation (4) below.

$$Ac = It*400*22.4*60/(4*96485) \quad (3)$$

$$Ad = (At*100/Dt) + Ac \quad (4)$$

Dt; Target concentration of hydrogen to be exhausted (D)

The control device 160 then compares the value obtained by adding a bypass minimum air flow rate Abl to the FC-required air flow rate An with the total air flow rate Ad, and sets the larger value as an air supply command value Asp for the air compressor 60 (see equation (5) below). The control device 160 obtains a bypass air flow rate Abp by substituting the set air supply command value Asp and the FC-required air flow rate An into equation (6) below. The bypass minimum air flow rate Abl represents the minimum value of the flow rate of air which should flow in the bypass line 31 during the low-efficiency operation.

$$Asp = \mathrm{MAX}\{(An+Abl),(Ad)\} \quad (5)$$

$$Abp = Asp - An \quad (6)$$

Upon determining the FC-required air flow rate An and the bypass air flow rate Abp, the control device 160 refers to a pressure-regulating valve-opening degree map mp4 and a bypass valve-opening degree map mp5. The pressure-regulating valve-opening degree map mp4 is a map for determining the degree of opening of the air pressure regulating valve A1 based on the FC-required air flow rate An and the bypass air flow rate Abp, and the bypass valve-opening degree map mp5 is a map for determining the degree of opening of the bypass valve B1 based on the FC-required air flow rate An and the bypass air flow rate Abp.

The control device 160 adjusts the degrees of opening of the air pressure regulating valve A1 and of the bypass valve B1 using the FC-required air flow rate An, the bypass air flow rate Abp, the pressure-regulating valve-opening degree map mp4, and the bypass valve-opening degree map mp5. At this time, the degree of opening of the air pressure regulating valve A1 is corrected using a PID correction term obtained from the deviation between a measured value of the FC current detected by the current sensor S5 and a target value.

The control device 160 judges whether or not the low-efficiency operation should be ended during the process of controlling the drive of the air compressor 60 in accordance with the set air supply command value As. If the temperature of the fuel cell 40 is equal to or higher than a preset reference temperature, the low-efficiency operation ends, whereas if the temperature of the fuel cell 40 is below the reference temperature, the above-mentioned processing continues.

Processing Concerning Bypass Valve

Figure 4:
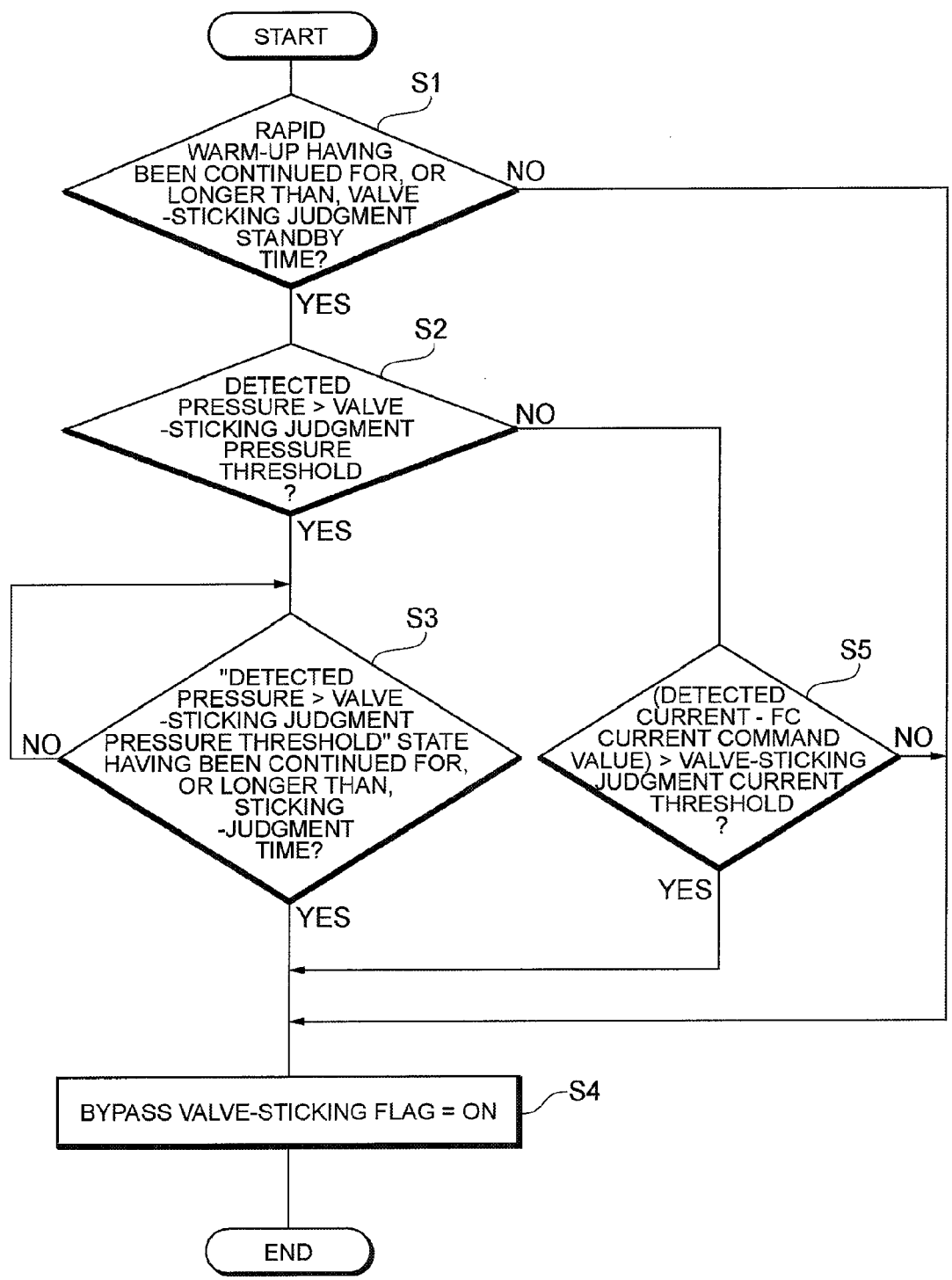
FIG. 4 is a flowchart explaining valve-sticking judgment processing during a rapid warm-up.

Next, valve-sticking judgment processing when the FC power generation is in a rapid warm-up state will be described with reference to the flowchart in FIG. 4.

First, when a rapid warm-up is started by carrying out low-efficiency power generation, the control device 160 judges whether or not the rapid warm-up has continued for or longer than a sticking-judgment standby time (S1). If the rapid warm-up has continued for or longer than the sticking-judgment standby time (YES), the control device 160 judges whether or not the pressure detected by the pressure sensor P1 (or P2) (outlet air pressure filter value) is greater than a valve-sticking judgment pressure threshold stored in a valve-sticking judgment pressure threshold map mp6 (S2). If the result of this judgment is positive (YES), the control device 160 judges whether or not the state where the detected pressure is greater than the valve-sticking judgment pressure threshold has continued for or longer than a sticking-judgment time (S3). If the result of this judgment is positive (YES), the control device 160 sets a bypass valve-sticking flag to ON, indicating a failure associated with a closed-valve malfunction of the bypass valve B1 (S4) and ends the processing of the current routine.

On the other hand, if the result of the judgment in S2 is negative (NO), the control device 160 judges whether the value obtained by subtracting the FC current command value from the current detected by the current sensor S5 (FC current filter value) is greater than a valve-sticking judgment current threshold (S5). The control device 160 proceeds to Steps S3 and S4 when the result of this judgment is positive (YES), and otherwise ends the processing of the current routine.

With the processing as described above, the control device 160 can determine that a failure associated with a closed-valve malfunction of the bypass valve B1 occurs when the pressure detected by the pressure sensor P1 exceeds the threshold or when the difference between the current detected by the current sensor S5 and the command value exceeds the threshold.

Figure 5:
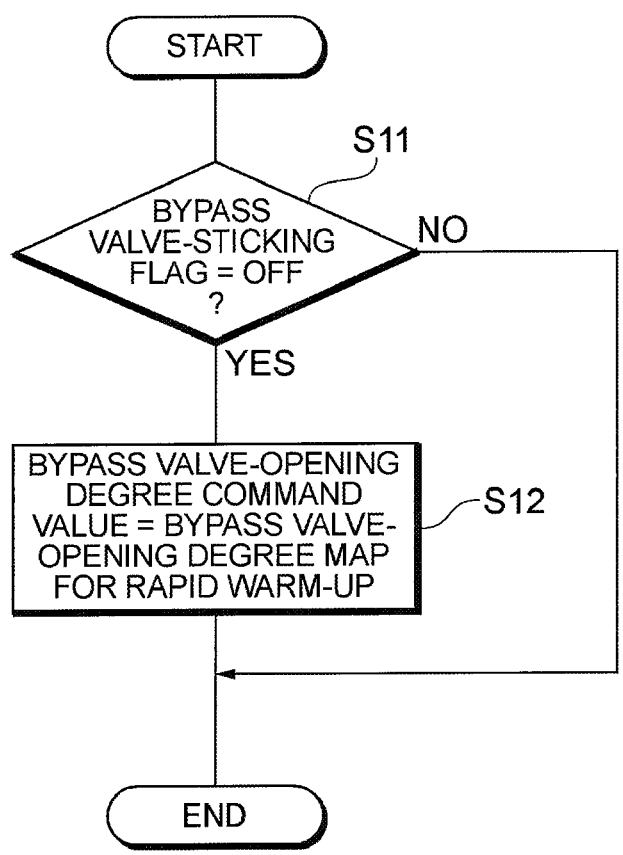
FIG. 5 is a flowchart explaining opening-degree command value calculation processing for a bypass valve during a rapid warm-up under normal conditions.

Next, opening-degree command value calculation processing for the bypass valve B1 performed when the rapid warm-up is carried out under the normal condition will be described with reference to the flowchart in FIG. 5.

First, the control device 160 judges whether or not the bypass valve-sticking flag is OFF (S11). As a result of this judgment, the control device 160 sets the degree of opening stored in a bypass valve-opening degree map mp7 for the rapid warm-up as a bypass valve-opening degree command value (S12) if the bypass valve-sticking flag is OFF (YES), and otherwise ends the processing of the current routine. In other words, when the rapid warm-up is carried out under normal conditions, the control device 160 sets the opening-degree command value for the bypass valve B1 to the degree of opening stored in the bypass valve-opening degree map mp7 for the rapid warm-up (the degree of opening obtained in consideration of the FC-required air amount and the bypass air flow rate.

Figure 6:
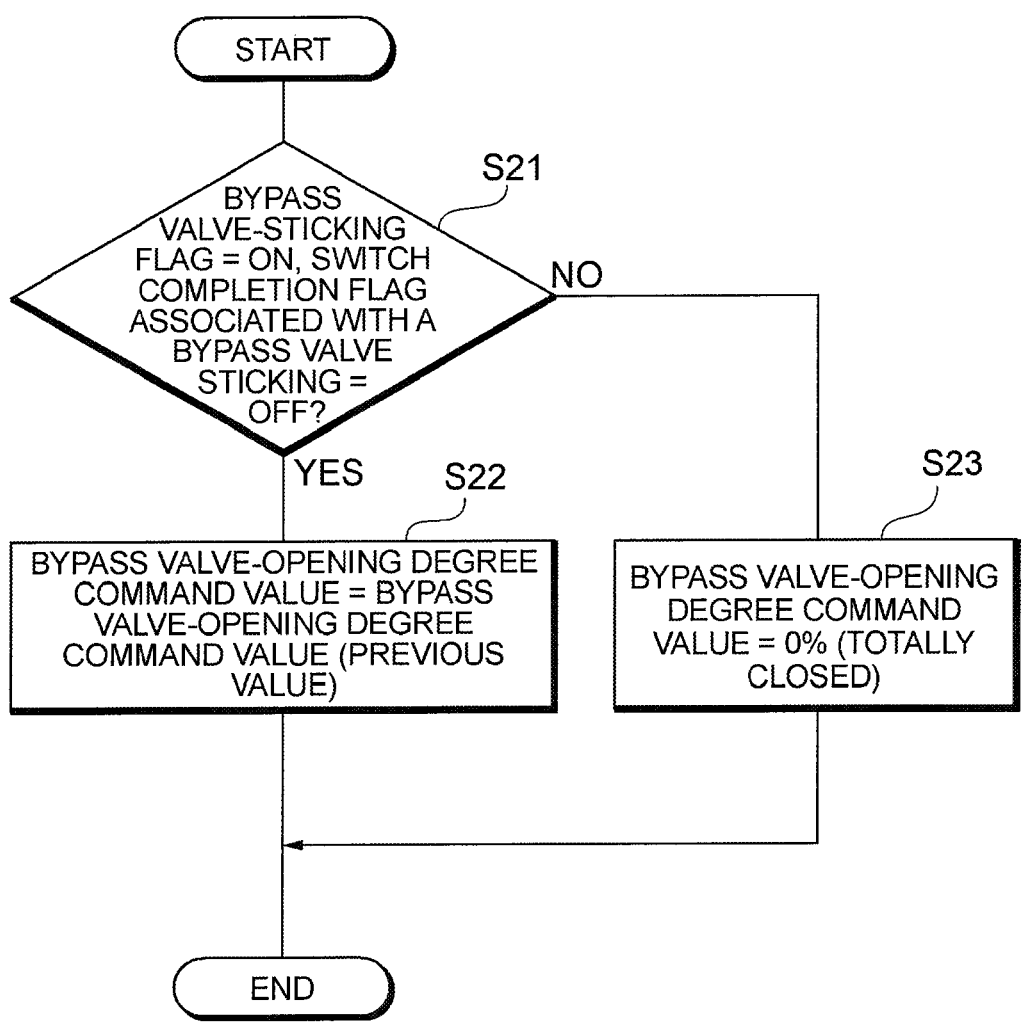
FIG. 6 is a flowchart explaining opening-degree command value calculation processing for the bypass valve when a failure occurs during a rapid warm-up.

Next, opening-degree command value calculation processing for the bypass valve B1 performed when the rapid warm-up is carried out during the occurrence of a failure will be described with reference to the flowchart in FIG. 6.

First, the control device 160 judges whether the bypass valve-sticking flag is ON while a switch completion flag associated with a bypass valve sticking being OFF (S21). When the result of this judgment is positive (YES), the control device 160 sets the bypass valve-opening degree command value of this time (at that current moment) as the previous bypass valve-opening degree command value (previous value) (S22) and ends the processing of the current routine.

On the other hand, when the result of the judgment in Step S21 is negative (NO), the control device 160 sets the bypass valve-opening degree command value to 0% (totally closed) (S23) and ends the processing of the current routine.

Figure 7:
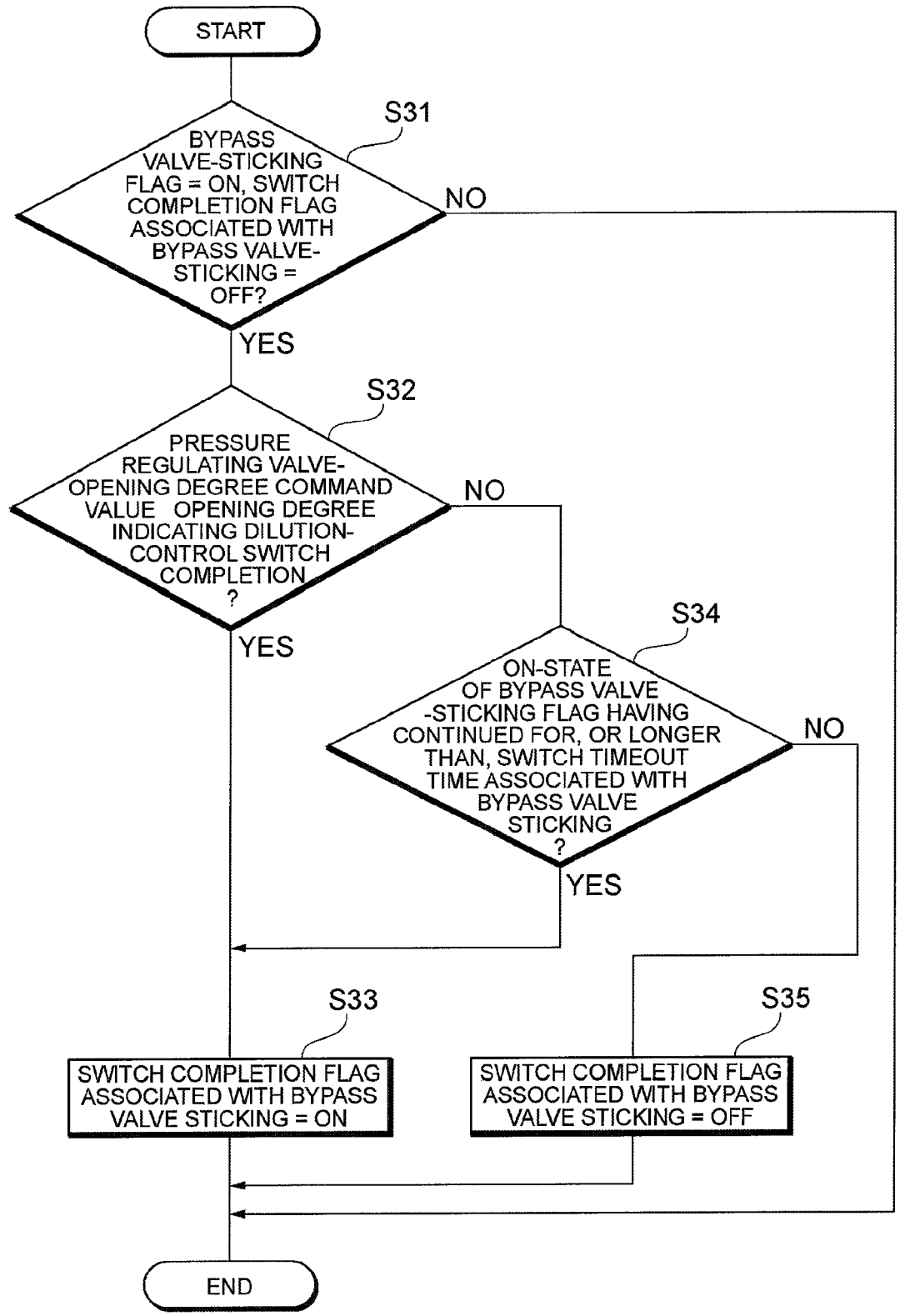
FIG. 7 is a flowchart explaining switch judgment processing for a pressure regulating valve when the bypass valve is stuck.

Next, switch judgment processing for the pressure regulating valve A1 performed when the bypass valve is stuck will be described with reference to the flowchart in FIG. 7.

First, the control device 160 judges, when the FC power generation is in the normal power generation state and not in an FC intermittent operation, whether the bypass valve-sticking flag is ON while the switch completion flag associated with the bypass valve-sticking is OFF (S31). If the result of this judgment is positive (YES), the control device 160 then judges whether or not a pressure regulating valve-opening degree command value is equal to or greater than an opening degree indicating dilution-control switch completion (S32). If the result of this judgment is positive (YES), the control device 160 sets the switch completion flag associated with the bypass valve sticking to ON (S33), and ends the processing of the current routine.

On the other hand, if the result of the judgment in Step S32 is negative (NO), the control device judges whether or not the ON-state of the bypass valve-sticking flag has continued for or longer than a switch timeout time associated with the bypass valve sticking (S34). If the result of this judgment is positive (YES), the processing proceeds to Step S33. On the other hand, if the result of the judgment in Step S34 is negative (NO), the control device 160 sets the switch completion flag associated with the bypass valve sticking to OFF (S35) and ends the processing of the current routine.

Figure 8:
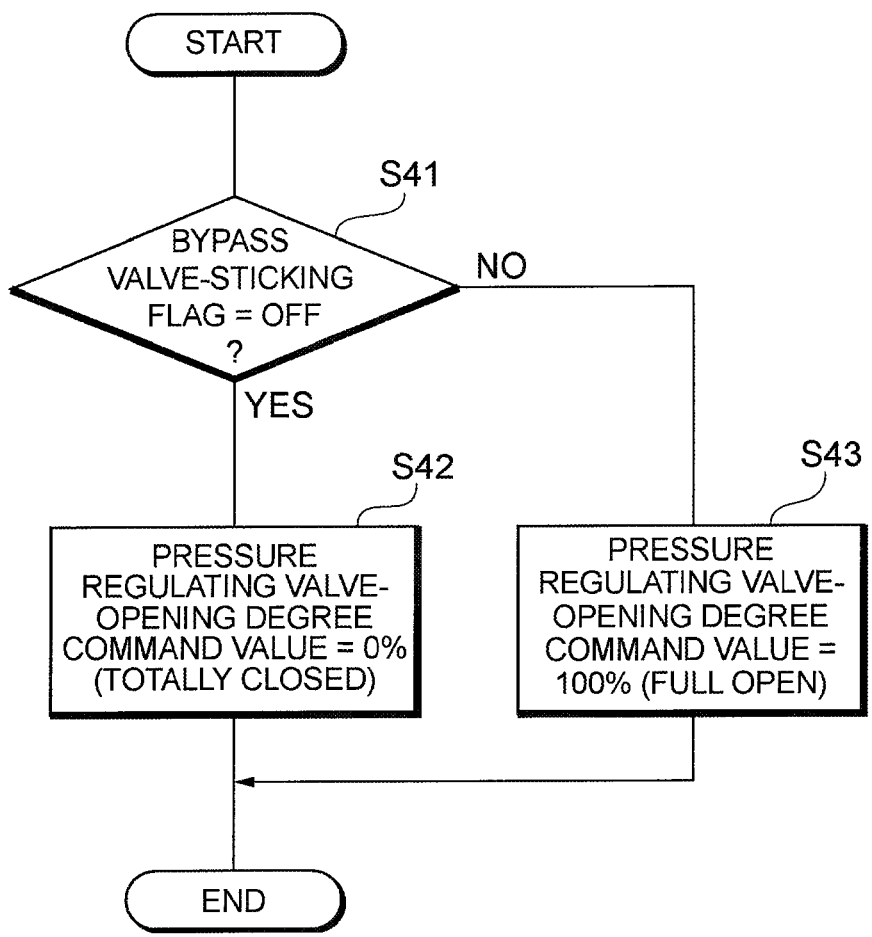
FIG. 8 is a flowchart explaining processing in a voltage-drop state for the pressure regulating valve.

Next, another switch judgment processing for the pressure regulating valve A1 when the bypass valve is stuck will be described with reference to the flowchart in FIG. 8.

First, the control device 160 judges, when the FC power generation is in a voltage-drop state, whether or not the bypass valve-sticking flag is OFF (S41). If the result of this judgment is positive (YES), the control device 160 sets the pressure regulating valve-opening degree command value to 0% (totally closed) (S42), and ends the processing of the current routine.

On the other hand, if the result of the judgment in Step S41 is negative (NO), the control device 160 sets the pressure regulating valve-opening degree command value to 100% (fully open) (S43), and ends the processing of the current routine. In Step S43, an air flow rate deviation (regulated pressure) is set to 0, and a regulated air pressure FB (Feed-Back) proportional term during the rapid warm-up, a FB integral term (previous value) and a FB correction value in a PI (Proportional-Integral) control by the control device 160 are all set to 0.

Figure 9:
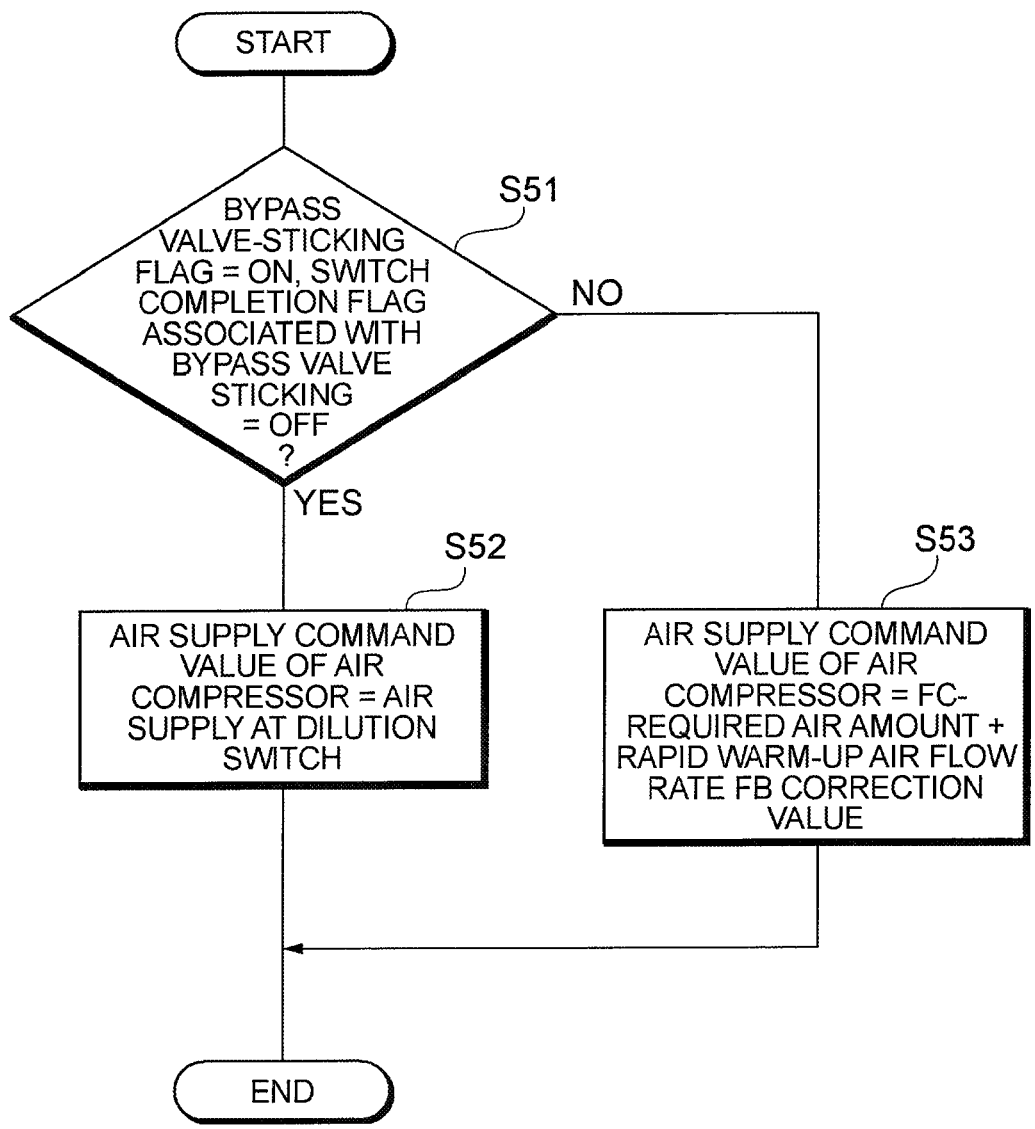
FIG. 9 is a flowchart explaining processing for an air compressor during a rapid warm-up.

Next, processing for the compressor 60 in the rapid warm-up will be described with reference to the flowchart in FIG. 9.

First, the control device 160 judges whether the bypass valve-sticking flag is ON while the switch completion flag associated with the bypass valve sticking being OFF (S51). If the result of this judgment is positive (YES), the control device 160 sets the air supply command value of the air compressor to an air supply at dilution switch (S52) and ends the processing of the current routine. On the other hand, if the result of the judgment in Step S51 is negative (NO), the control device 160 sets the air supply command value of the air compressor to the value: the FC-required air amount+a rapid warm-up air flow rate FB correction value (S53), and ends the processing of the current routine.

In short, the control device 160 sets the air supply command value for, when a failure occurs, reducing the revolution speed of the air compressor 60 to reduce the amount of air to be discharged in the bypass valve B1.

Figure 10:
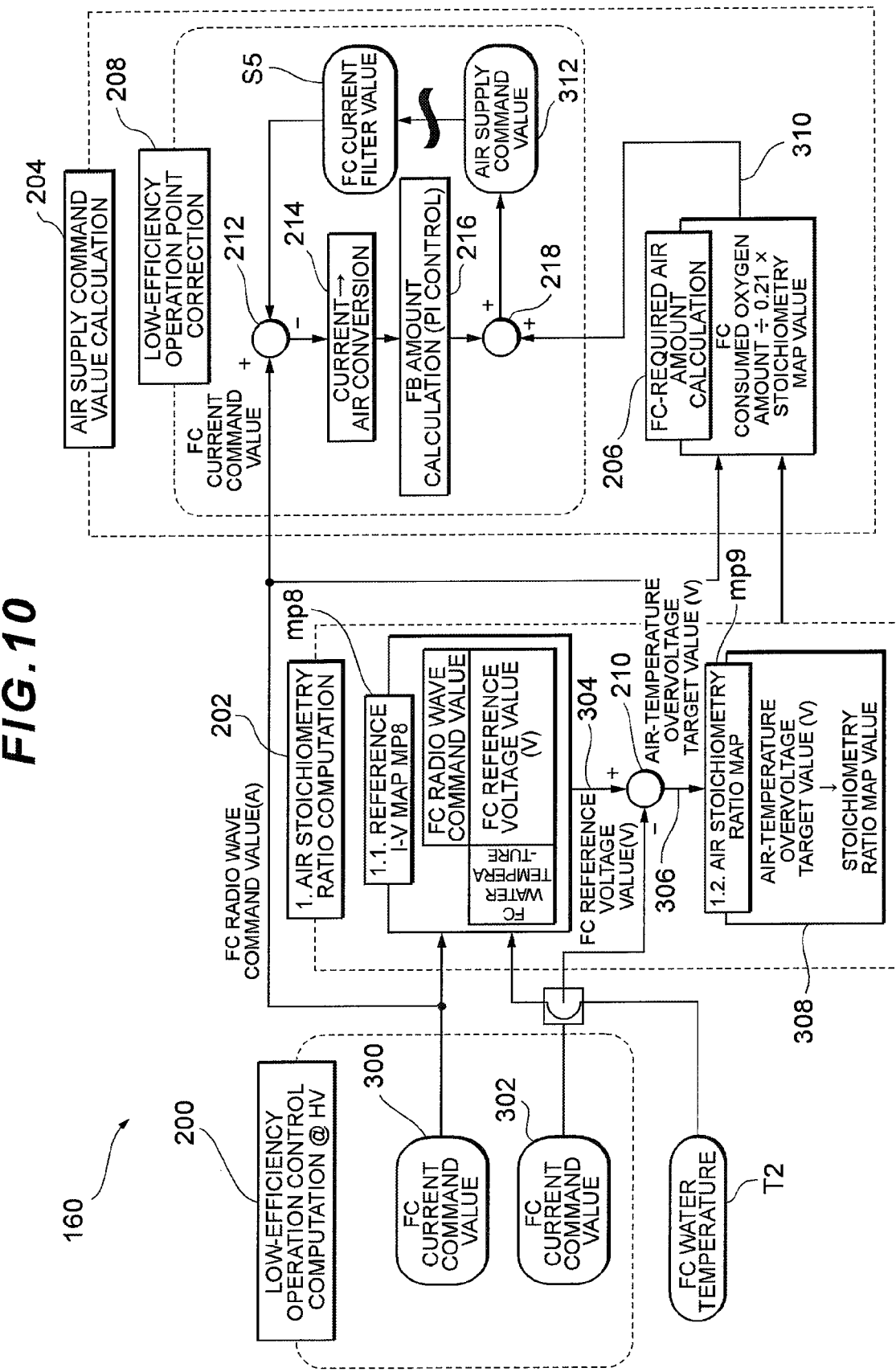
FIG. 10 is a block diagram illustrating air supply control and hydrogen dilution control during a rapid warm-up.

Next, air supply control and hydrogen dilution control in the rapid warm-up will be described with reference to the block diagram of FIG. 10.

In this embodiment, in a situation where the bypass valve B1 and the pressure regulating valve A1 are stuck due to freezing, etc., when a rapid warm-up mode operation is carried out during start-up of the system or in a parking range, the bypass control using the bypass valve B1 is stopped and a low-efficiency operation point correction is carried out using an air compressor flow rate. At this time, even in the rapid warm-up mode operation, where a guard is provided for an operation point by a low-efficiency operation control computation so that the concentration of the pumping hydrogen does not exceed a target concentration, e.g., during low-efficiency operations including operations during a drive range and during a neutral range, a bypass dilution control is not carried out.

Specifically, the control device 160 is configured to have the functions of: a low-efficiency-operation-control computing unit 200; an air-stoichiometry-ratio computing unit 202; an air-supply-command-value calculating unit 204; an FC-required-air-amount calculating unit 206; and a low-efficiency-operation-point correcting unit 208. For example, the low-efficiency operation control computing unit 200 calculates an FC current command value 300 and an FC voltage command value 302 for the fuel cell system 40 during the low-efficiency power generation, based on electrical power required from the fuel cell system. The air stoichiometry ratio computing unit 202 makes a search in a reference I-V map mp8 based on an FC water temperature detected by the temperature sensor T2 and the FC current command value 300 to extract an FC reference voltage value 304, generates an air-concentration overvoltage target value 306 by calculating the deviation between the extracted FC reference voltage value 304 and the FC voltage command value 302 using a deviation calculating unit 210, and makes a search in an air stoichiometry ratio map mp9 based on the air-concentration overvoltage target value 306 to extract a stoichiometry ratio map value 308 corresponding to the air-concentration overvoltage target value 306.

The FC-required air amount calculating unit 206 calculates an FC-required air amount 310 as follows: FC consumed oxygen amount/k (coefficient)*stoichiometry map value 308.

The low-efficiency-operation-point correcting unit 208 calculates the deviation between an FC current filter value detected by the current sensor S5 and the FC current command value 300 using a deviation calculating unit 212, converts the current calculated by the deviation calculating unit 212 to an air amount using a converter 214, calculates a FB amount using a PI control unit 216 based on the output from the converter 214, adds up the calculation result by the PI control unit 216 and the FC air amount 310 using an adder 218, and outputs the output from the adder 218 as the air supply command value 312 to the air compressor 60. The air compressor 60 controls its revolution speed using the air supply command value 312 as a revolution speed command value. The air supply command value 312 is supplied to the air compressor 60 as a command to reduce its revolution speed when a failure associated with a closed-valve malfunction of the bypass valve B1 occurs, with respect to the revolution speed in the normal operation. As the revolution speed of the air compressor is reduced, the amount of air to be discharged by the air compressor is also reduced in accordance with the reduction in the revolution speed of the air compressor 60.

According to this embodiment, when a failure associated with a closed-valve malfunction of the bypass valve B1 occurs, the degree of opening of the pressure regulating valve A1 is increased while the revolution speed of the air compressor is reduced to reduce the amount of air to be discharged, so that the supply of the oxidant gas to the fuel cell 40 is reduced while ensuring an exhaust flow path for cathode-off gas. Such a configuration can prevent excessive stoichiometry ratio in the fuel cell 40, and can continue a rapid warm-up operation for carrying out the low-efficiency power generation, even when a failure occurs in the bypass valve B1.

In this embodiment, once the pressure regulating valve A1 is opened to a specified degree of opening, the voltage drop processing can be continued by controlling the revolution speed of the air compressor 60 so as to be equal to the air flow rate obtained from a rapid warm-up revolution speed map.

In this embodiment, a failure in the bypass valve B1 may be determined by judging whether or not an absolute value or a change rate of the difference obtained by subtracting the FC current command value from the current detected by the current sensor S5 (FC current filter value) exceeds a valve-sticking judgment current threshold, instead of judging whether or not the difference between the current detected by the current sensor S5 and the current command value exceeds the valve-sticking judgment current threshold.

Although this embodiment has described reducing the revolution speed of the air compressor as an example of means for reducing the air supply to the fuel cell 40, such means is not limited. Any means may be employed as long as air supply pressure to the fuel cell can be reduced, and thus various well-known techniques for, for example, exhausting air outside, opening a temporary reservoir tank, and opening, if an additional bypass path is provided, the additional bypass, may be applied.

Although this embodiment has described increasing the degree of opening of the pressure regulating valve A1 as an example of means for reducing the pressure on the exhaust side of the fuel cell 40, but such means is not limited. Any means may be employed as long as the pressure on the exhaust side may be reduced, and thus various well-known techniques for, for example, opening a purge valve provided in the cathode-off gas path and opening the temporary reservoir tank may be applied.

Industrial Applicability

The fuel cell system according to the present invention is suitable for use in preventing an excessive stoichiometry ratio in a fuel cell even when a failure occurs in a bypass valve during low-efficiency power generation.

The invention claimed is:

1. A fuel cell system, comprising:
   a bypass valve provided in a bypass path for providing a bypass between an air supply side of a fuel cell and an air exhaust side of the fuel cell;
   an air backpressure valve provided on the air exhaust side of the fuel cell;
   an air compressor for supplying air to the air supply side of the fuel cell;
   a bypass failure detector for detecting a failure in the bypass valve and including a pressure sensor for detecting a pressure on an air-discharge side of the air compressor; and
   a controller programmed to control the air backpressure valve and the air compressor,
   wherein in response to a detection output from the bypass failure detector that a failure has occurred in the bypass valve during low-efficiency operation, the controller increases the degree of opening of the air backpressure valve to increase an amount of cathode-off gas to be discharged and reduces the revolution speed of the air compressor to reduce air supply.

2. The fuel cell system according to claim 1, wherein the bypass failure detector monitors the pressure on the air-discharge side of the air compressor, and detects a failure associated with a closed-valve malfunction of the bypass valve when the pressure exhibits an abnormal value.

3. A fuel cell system, comprising:
   a bypass valve provided in a bypass path for providing a bypass between an air supply side of a fuel cell and an air exhaust side of the fuel cell;
   an air backpressure valve provided on the air exhaust side of the fuel cell;
   an air compressor for supplying air to the air supply side of the fuel cell;
   a bypass failure detector for detecting a failure in the bypass valve and including a current sensor for detecting a current of the fuel cell; and
   a controller programmed to control the air backpressure valve and the air compressor,
   wherein in response to a detection output from the bypass failure detector that a failure has occurred in the bypass valve during low-efficiency operation, the controller increases the degree of opening of the air backpressure valve to increase an amount of cathode-off gas to be discharged and reduces the revolution speed of the air compressor to reduce air supply.

4. The fuel cell system according to claim 1, wherein the bypass failure detector further comprises:
   a pressure judgment unit for judging a failure associated with a closed-valve malfunction of the bypass valve when a pressure detected by the pressure sensor exceeds a pressure threshold.

5. The fuel cell system according to claim 3, wherein the bypass failure detector further comprises:
   a current judgment unit for judging a failure associated with a closed-valve malfunction of the bypass valve when the difference between a current detected by the current sensor and a current command value exceeds a current threshold.

6. The fuel cell system according to claim 3, wherein the bypass failure detector detects a failure associated with a closed-valve malfunction of the bypass valve when an absolute value or a change rate of a current of the fuel cell exceeds a current threshold.

* * * * *

UNITED STATES PATENT AND TRADEMARK OFFICE
CERTIFICATE OF CORRECTION

PATENT NO.        : 8,691,453 B2                                                      Page 1 of 1
APPLICATION NO.   : 12/810121
DATED             : April 8, 2014
INVENTOR(S)       : Kanie et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 961 days.

Signed and Sealed this

Twenty-ninth Day of September, 2015

Michelle K. Lee
*Director of the United States Patent and Trademark Office*